United States Patent
Norwich et al.

(10) Patent No.: US 12,158,199 B2
(45) Date of Patent: Dec. 3, 2024

(54) TORQUE CONVERTER WITH TURBINE DRIVEN CLUTCH CONNECTION

(71) Applicant: Schaeffler Technologies AG & Co. KG, Herzogenaurach (DE)

(72) Inventors: Victor Norwich, Wooster, OH (US); Timothy Chamberlain, Wooster, OH (US); Larry Chad Boigegrain, Copley, OH (US); Corey Hillegass, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/413,119

(22) Filed: Jan. 16, 2024

(65) Prior Publication Data

US 2024/0151299 A1    May 9, 2024

Related U.S. Application Data

(62) Division of application No. 17/883,671, filed on Aug. 9, 2022, now Pat. No. 11,913,530.

(60) Provisional application No. 63/240,353, filed on Sep. 2, 2021.

(51) Int. Cl.
   F16H 41/24    (2006.01)
   F16H 45/02    (2006.01)

(52) U.S. Cl.
   CPC ............ *F16H 45/02* (2013.01); *F16H 41/24* (2013.01); *F16H 2045/021* (2013.01); *F16H 2045/0263* (2013.01); *F16H 2045/0294* (2013.01)

(58) Field of Classification Search
   CPC .... F16H 45/02; F16H 41/24; F16H 2045/021; F16H 2045/0263; F16H 2045/0294
   See application file for complete search history.

(56) References Cited

U.S. PATENT DOCUMENTS

| | | | | |
|---|---|---|---|---|
| 9,752,667 | B2 * | 9/2017 | Depraete | F16H 45/02 |
| 9,803,735 | B2 * | 10/2017 | Lindemann | F16H 45/02 |
| 10,465,782 | B2 * | 11/2019 | Vanni | F16D 13/32 |
| 10,571,006 | B2 * | 2/2020 | Maienschein | F16H 45/02 |
| 2018/0031098 | A1 * | 2/2018 | Adari | F16H 45/02 |

* cited by examiner

*Primary Examiner* — Dustin T Nguyen

(57) ABSTRACT

A torque converter includes a front cover arranged to receive a torque and an impeller having an impeller shell connected to the front cover. The torque converter further includes a turbine in fluid communication with the impeller and including a turbine shell. The torque converter further includes a lock-up clutch including a clutch plate that is non-rotatably connected to the turbine shell.

10 Claims, 4 Drawing Sheets

TORQUE CONVERTER WITH TURBINE DRIVEN CLUTCH CONNECTION

CROSS-REFERENCE TO RELATED APPLICATIONS

This application is a divisional application of U.S. patent application Ser. No. 17/883,671 filed Aug. 9, 2022, which in turn claims the benefit of U.S. Provisional Patent Application No. 63/240,353, filed Sep. 2, 2021, the disclosures of which are incorporated by reference herein.

TECHNICAL FIELD

The present disclosure relates to a torque converter for a vehicle. In particular, the torque converter is provided with a turbine driven clutch connection.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a cover of the torque converter to bypass the fluid coupling. In some torque converter arrangements, due to packaging constraints, the ability to connect the lock-up clutch to the damper package may be limited by the placement of the centrifugal pendulum absorber (CPA) in the damper package.

SUMMARY

In one embodiment, a torque converter includes a front cover configured to receive a torque and an impeller having an impeller shell non-rotatably connected to the front cover. The torque converter further includes a turbine in fluid communication with the impeller and including a turbine shell. The torque converter further includes a lock-up clutch including a clutch plate that is non-rotatably connected to the turbine shell.

In embodiments, the clutch plate may be directly connected to the turbine shell. The clutch plate may include a tab and the turbine shell may include a slot. The tab may be received in the slot. The slot may extend axially through the turbine shell. The tab may extend through the slot to an end. The tab may include a recess extending through radial sides of the tab and extending axially from the end towards the slot. The turbine may include two blades circumferentially spaced from each other. The slot may be disposed circumferentially between the two blades. The torque converter may include a damper assembly axially disposed between the front cover and the turbine shell. The slot may be disposed radially outside of the damper assembly.

In embodiments, the torque converter may include a ring fixed to the turbine shell. The clutch plate may be non-rotatably connected to the turbine shell via the ring. The ring may include a first end fixed to the turbine shell and a second end spaced from the turbine shell. The clutch plate may be connected to the second end of the ring. The second end may be arranged radially offset relative to the first end. The clutch plate may include a tab, and the second end may include a slot. The tab may be received in the slot. The slot may extend axially through the ring. The tab may extend through the slot to an end. The tab may include a recess extending through radial sides of the tab and extending axially from the end towards the slot. The second end may be axially spaced from the turbine shell. The second end may be arranged radially offset relative to the first end. The clutch plate may be axially spaced from the turbine shell. The torque converter may include a damper assembly axially disposed between the front cover and the turbine shell. The ring may be disposed radially outside of the damper assembly.

In embodiments, the torque converter may include a damper assembly axially disposed between the front cover and the turbine shell. The ring may be disposed radially outside of the damper assembly. In embodiments, the lock-up clutch may include a reaction plate disposed axially between the front cover and the turbine shell. In embodiments, the lock-up clutch may include a piston disposed axially between the front cover and the clutch plate.

Instead of having a separate tabbed connection, embodiments described herein provide a clutch connected to the turbine shell as part of the torque path since the turbine shell is already connected to the damper assembly. This allows the turbine shell to be driven directly with the clutch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
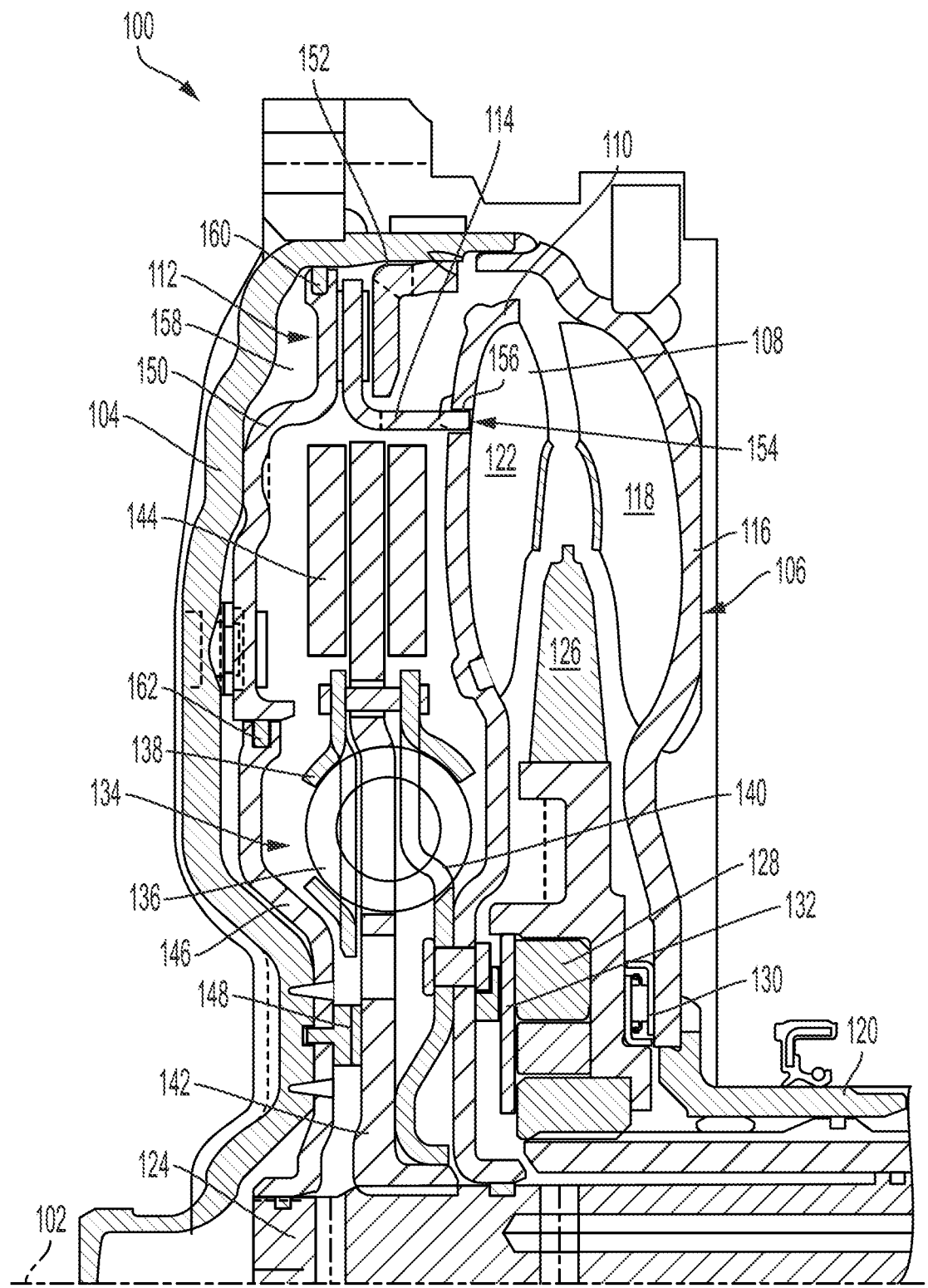
FIG. 1 is a cross-sectional view of a torque converter having turbine driven clutch connection according to an embodiment of the present disclosure.
Figure 2:
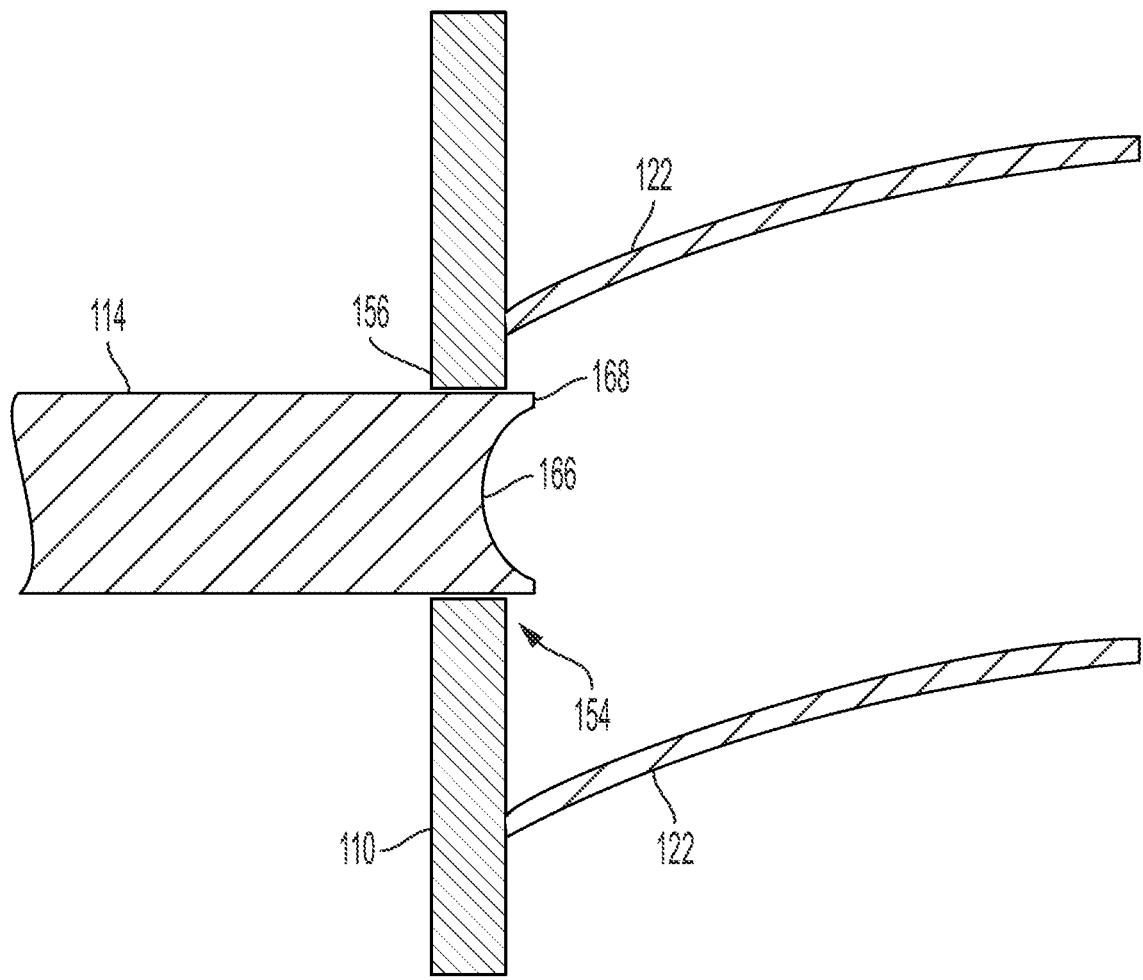
FIG. 2 is a top view of an area of the torque converter of FIG. 1 showing the turbine driven clutch connection.

Referring to FIGS. 1-2, a portion of torque converter 100 is illustrated according to one embodiment of the present disclosure. At least some portions of torque converter 100 are rotatable about central axis 102. While only a portion of torque converter 100 above central axis 102 is shown in FIG. 1, it should be understood that torque converter 100 can appear substantially similar below central axis 102 with many components extending about central axis 102. Words such as "axial," "radial," "circumferential," "outward," etc. as used herein are intended to be with respect to central axis 102.

Torque converter 100 includes: front cover 104 arranged to receive torque; impeller 106; turbine 108 in fluid communication with impeller 106 and having turbine shell 110; and lock-up clutch 112 having clutch plate 114 non-rotatably connected to the turbine shell 110. Impeller 106 includes: impeller shell 116 non-rotatably connected to front cover 104 such that impeller 106 rotates as front cover 104 rotates, at least one impeller blade 118 attached to an inner surface of the impeller shell 116, and impeller hub 120 attached to a radially inner end of impeller shell 116. Turbine 108 includes at least one turbine blade 122 attached to the turbine shell 110. Turbine shell 110 may be non-rotatably connected to transmission input shaft 124.

Torque converter 100 may include: stator 126 disposed axially between impeller 106 and turbine 108 to redirect fluid flowing from turbine blade 122 before the fluid reaches impeller 106 to increase an efficiency of torque converter 100. For example, impeller blade 118, when rotated about central axis 102, pushes the fluid outwardly. The fluid pushes against turbine 108 of torque converter 100, causing turbine 108 to revolve about central axis 102. Stator 126 functions to return the fluid from turbine 108 back to impeller 106 with minimal or no power loss. Drive power is transmitted from turbine 108 to transmission input shaft 124. Torque converter 100 may, for example, further include: one-way clutch 128 disposed within stator 126, thrust bearing 130 disposed axially between stator 126 and impeller shell 116, and side plate 132 configured to retain the one-way clutch 128 within the stator 126.

Torque converter 100 also includes damper assembly 134 for hydraulically transferring torque through torque converter 100. Damper assembly 134 is positioned axially between front cover 104 and turbine 108 and is configured to transfer torque from front cover 104 to transmission input shaft 124. Damper assembly 134 includes: springs 136; cover plates 138, 140; and output flange 142. Cover plate 138 may support springs 136 on one axial side. Cover plate 140 may support springs 136 on another, opposite axial side. Cover plates 138, 140 may be connected to each other and output flange 142, for example, via a rivet, radially outward of springs 136. Cover plate 140 may further be connected to turbine shell 110, for example, by a rivet. Torque converter 100 may include centrifugal pendulum absorber 144 connected to output flange 142.

Output flange 142 is connected to transmission input shaft 124 for torque transmission therebetween. Output flange 142 includes a hole (not numbered) extending axially through output flange 142. The hole is configured to permit a tool, e.g., a rivet tool, to connect cover plate 140 to turbine shell 110.

Torque converter 100 may include seal plate 146 and thrust washer 148 disposed between seal plate 146 and output flange 142. Thrust washer 148 may be retained by seal plate 146. Seal plate 146 is non-rotatably connected to front cover 104, e.g., via welds, and sealed to transmission input shaft 124 at an inner diameter thereof.

Power from a vehicle engine (not shown) can be transmitted to a transmission via fluid, and via the torque converter. In particular, the power may first be transmitted to front cover 104 of torque converter 100. Lock-up clutch 112 configured to selectively transfer torque from front cover 104 to transmission input shaft 124. Lock-up clutch 112 further includes piston 150 and reaction plate 152.

Piston 150 may be connected to front cover 104 via a leaf-spring connection and sealed to front cover 104 at an outer diameter thereof. Reaction plate 152 may be fixed to front cover 104 via a weld for example. Clutch plate 114 may be disposed between piston 150 and reaction plate 152. Clutch plate 114 may further be connected to turbine shell 110 at one end, for example, via a tabbed connection. Clutch plate 114 may be directly connected to turbine shell 110 such that turbine shell 110 is driven by the lock-up clutch 112. Clutch plate 114 may include tabs 154. Turbine shell 110 may include punched slots 156 circumferentially spaced from turbine blade 122. For example, the slots 156 may be arranged circumferentially between two turbine blades 122. The tabs 154 engage with punched slots 156 such that turbine shell 110 rotates when clutch plate 114 rotates. Additionally, tabs 154 may have a concave recess 166 at an end 168 to reduce the amount of flow obstruction in a torus of torque converter 100.

Piston 150 engages or closes lock-up clutch 112 in response to the pressurization of a medium (e.g., fluid such as oil) in piston apply chamber 158 defined between front cover 104 and piston 150. During axial movement of piston 150, piston 150 slides along seal plate 146. Piston 150 is sealed at an outer diameter to front cover 104 via seal 160 and sealed at an inner diameter to cover centering or seal plate 146 via seal 162. Seals 160, 162 maintain a fluid separation between piston apply chamber 158 and the rest of torque converter 100. Piston apply chamber 158 is further defined by, or bounded between, front cover 104, seal 160, piston 150, seal 162, and seal plate 146. By "bounded in part," we mean that a portion of the cited chamber, flow path, or other structure is bounded, or formed, by the cited element.

According to embodiments disclosed herein, a torque path goes from piston 150 and reaction plate 152 to clutch plate 114. However, instead of having a tabbed connection to the damper assembly 134, directly, tabs 154 on clutch plate 114 interact directly with turbine shell 110. In this embodiment, tabs 154 are configured to engage with the punched slots 156 in the turbine shell 110 in between the turbine blades 122 that allow torque to be transmitted directly through the interface. The turbine shell 110 directly drives cover plate 140 on damper assembly 134.

Figure 3:
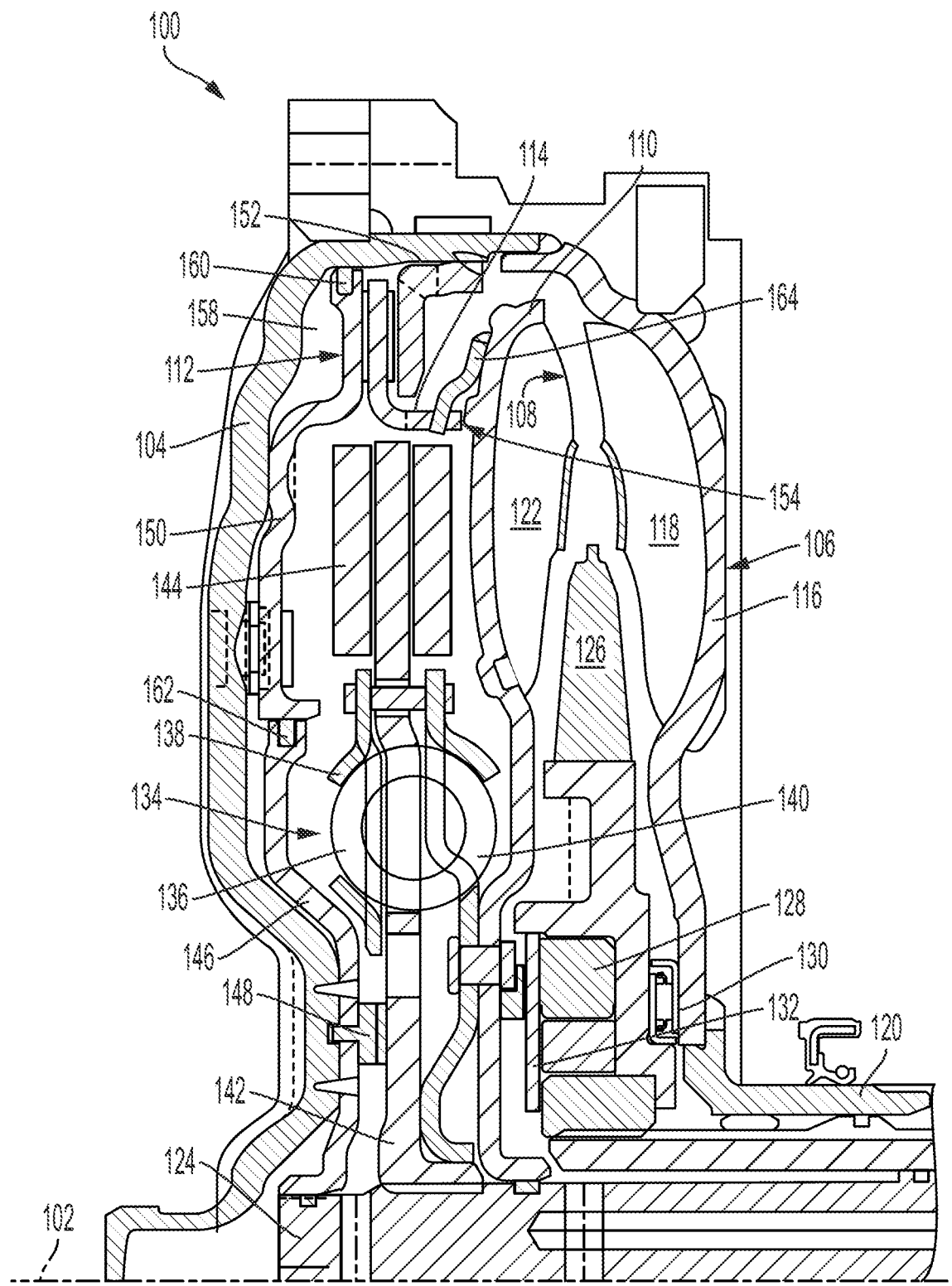
FIG. 3 is a cross-sectional view of a torque converter having turbine driven clutch connection according to another embodiment of the present disclosure.
Figure 4:
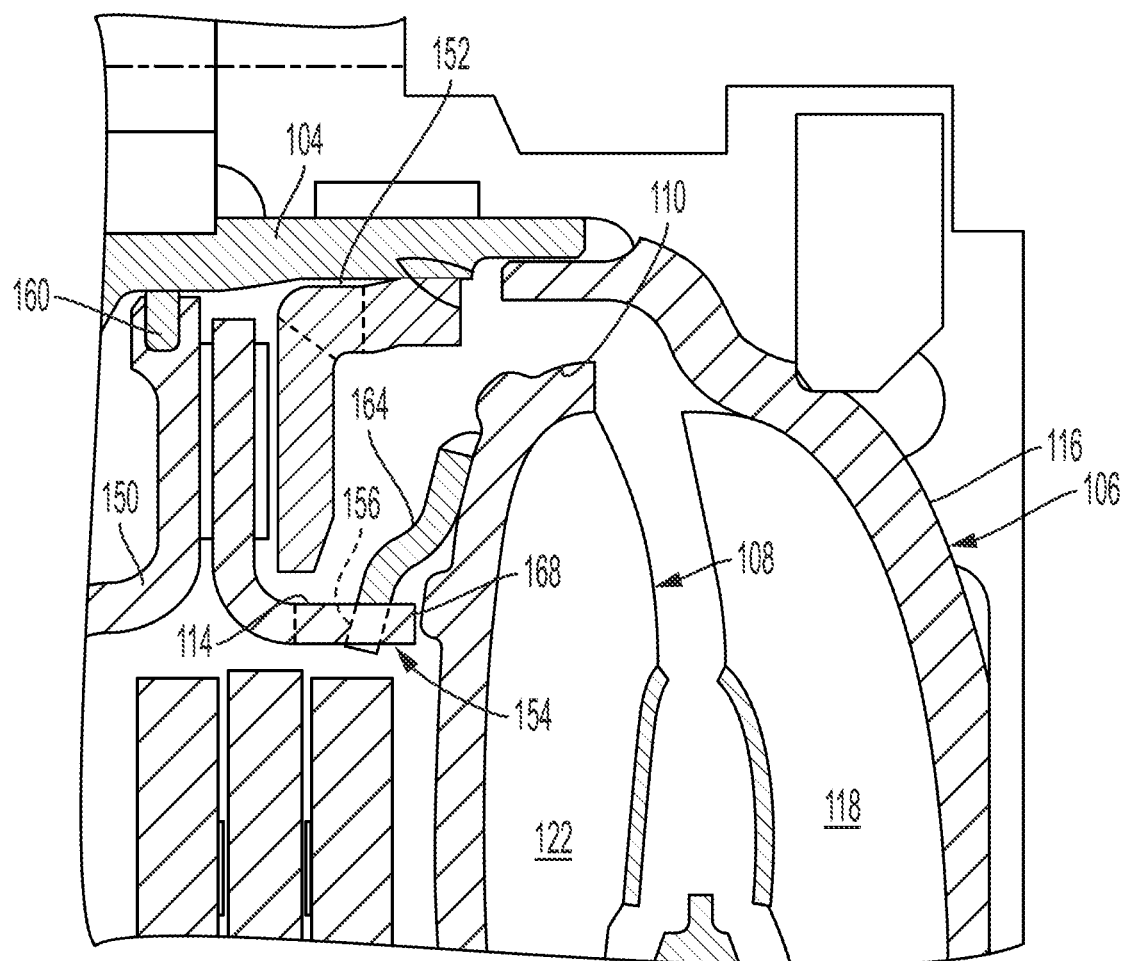
FIG. 4 is an enlarged view of an area of the torque converter shown in FIG. 3.

Referring to FIGS. 3-4, an alternative embodiment for a turbine driven clutch connection is provided. In contrast to FIGS. 1-2, torque converter 100 includes ring 164. Ring 164 is fixed to turbine shell 10, for example, via welding. In this embodiment, clutch plate 114 is connected to turbine shell 110 via ring 164. Clutch plate 114 includes tabs 154 that interface with ring 164 instead of having the tabs 154 slot into the turbine shell 110 as shown in FIGS. 1-2. That is, ring 164 may include punched slots 156 configured to engage tabs 154 of clutch plate 114. The torque path is the same after ring 164 where torque is transmitted through the turbine shell 110 and into cover plate 140.

Engaging clutch plate 114 with turbine shell 110 allows for directly driving cover plate 140 on damper assembly 134 via turbine shell 110, which reduces axial clearance between piston 150 and turbine shell 110 by removing a direct connection between clutch plate 114 and damper assembly 134 while achieving desired operation of torque converter 100.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Torque converter
102 Central axis
104 Front cover
106 Impeller
108 Turbine
110 Turbine shell
112 Lock-up clutch
114 Clutch plate
116 Impeller shell
118 Impeller blade
120 Impeller hub
122 Turbine blade
124 Transmission input shaft
126 Stator
128 One-way clutch
130 Thrust bearing
132 Side plate
134 Damper assembly
136 Springs
138 Cover plate
140 Cover plate
142 Output flange
144 Centrifugal pendulum absorber
146 Seal plate
148 Thrust washer
150 Piston
152 Reaction plate
154 Tab
156 Slot
158 Piston apply chamber
160 Seal
162 Seal
164 Ring
166 Recess
168 End

What is claimed is:

1. A torque converter comprising:
a front cover configured to receive a torque;
an impeller having an impeller shell non-rotatably connected to the front cover;
a turbine in fluid communication with the impeller and including a turbine shell; and
a lock-up clutch including a clutch plate non-rotatably connected to the turbine shell;
wherein the clutch plate includes a tab and the turbine shell includes a slot, the tab being received in the slot;
wherein the tab extends through the slot to an end, the tab including a recess extending through radial sides of the tab and extending axially from the end towards the slot.

2. The torque converter of claim 1, wherein the slot extends axially through the turbine shell.

3. The torque converter of claim 1, wherein the turbine includes two blades circumferentially spaced from each other, the slot being disposed circumferentially between the two blades.

4. The torque converter of claim 1, further comprising a damper assembly axially disposed between the front cover and the turbine shell, the slot being disposed radially outside of the damper assembly.

5. The torque converter of claim 1, further comprising a damper assembly axially disposed between the front cover and the turbine shell, the clutch plate being disposed radially outside of the damper assembly.

6. The torque converter of claim 1, wherein the lock-up clutch includes a piston disposed axially between the front cover and the clutch plate.

7. The torque converter of claim 6, wherein the lock-up clutch includes a reaction plate fixed to the front cover and disposed between the piston and the turbine shell.

8. The torque converter of claim 7, wherein the clutch plate includes a radially extending portion disposed between the piston and the reaction plate and an axially extending portion arranged radially insider of the reaction plate and extending from the radially extending portion.

9. The torque converter of claim 8, wherein the axially extending portion includes the tab.

10. The torque converter of claim 8, wherein the slot is disposed axially between the recess and the radially extending portion.

* * * * *